H. W. ARMSTRONG.
RADIATOR CONNECTION.
APPLICATION FILED APR. 25, 1910.
981,355.
Patented Jan. 10, 1911.
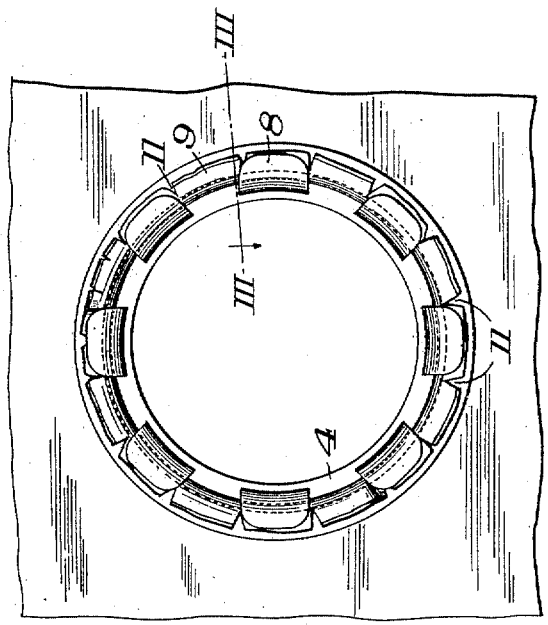
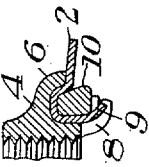
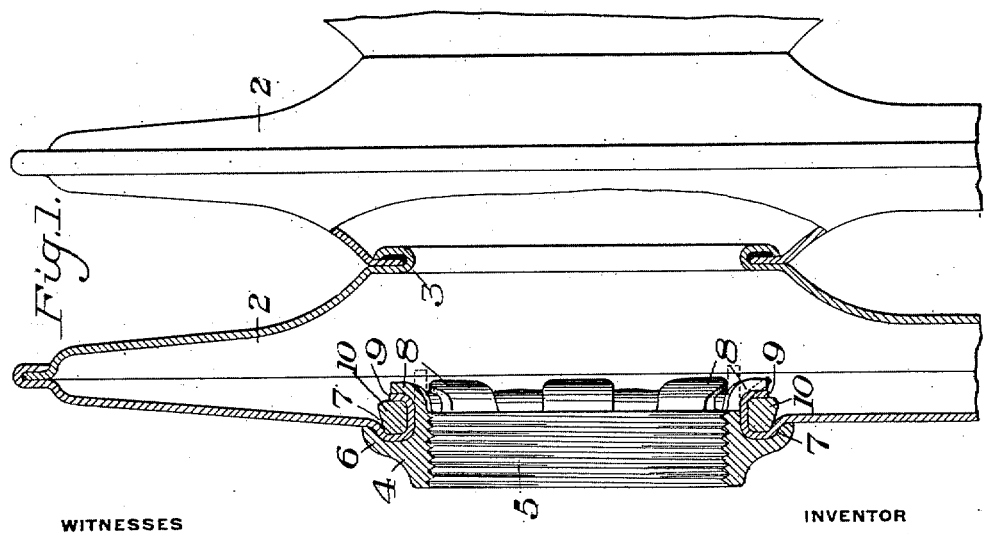
WITNESSES
INVENTOR
H. W. Armstrong,
by Bakewell, Byrnes & Parmelee,
his Attys.

UNITED STATES PATENT OFFICE.

HARRY W. ARMSTRONG, OF OAKMONT, PENNSYLVANIA, ASSIGNOR TO THE PRESSED RADIATOR COMPANY OF AMERICA, OF PITTSBURG, PENNSYLVANIA, A CORPORATION OF PENNSYLVANIA.

RADIATOR CONNECTION.

981,355.  Specification of Letters Patent.  Patented Jan. 10, 1911.

Application filed April 25, 1910. Serial No. 557,570.

*To all whom it may concern:*

Be it known that I, HARRY W. ARMSTRONG, of Oakmont, Allegheny county, Pennsylvania, have invented a new and useful Radiator Connection, of which the following is a full, clear, and exact description, reference being had to the accompanying drawings, forming part of this specification, in which—

Figure 1 is a view partly in vertical section and partly in side elevation, of a portion of a pressed metal radiator having my invention applied thereto; Fig. 2 is a plan view showing the connection; and Fig. 3 is a sectional detail view, on the line III—III of Fig. 2, showing the locking engagement of the coupling member with the metal of the section.

My invention has relation to radiator connections, and is designed to provide means of simple and effective character for making a secure connection and joint between a pressed metal radiator section and a nipple or coupling to which a circulating pipe of the radiator is connected.

Referring to the accompanying drawings, the numerals 2 designate two adjacent sections of a pressed metal radiator joined to each other by suitable seams, such as shown at 3.

4 is a nipple or coupling for the connection of a circulating pipe to the end section of the radiator. This nipple or coupling is provided with an internal thread 5 for engagement with the external thread of the pipe (not shown). The nipple or coupling is formed of malleable metal, and has the surrounding lip or flange 6 partially overhanging a recess 7, and also a plurality of lugs or projections 8 at its inner end.

In the construction of the radiator the edge portion 9 of the sheet metal of the end section surrounding the opening for the nipple 4 is bent around a ring 10 in the manner substantially as shown in Fig. 1, and the nipple or coupling is then inserted in the opening, the ring with the sheet metal partially wrapped around the same seating in the recess 7, the lugs or projections 8 being in the position shown in dotted lines in Fig. 1. The lugs 8 are subsequently bent or pressed outwardly and over against the edge portion of the metal, thereby clamping the ring and edge portion of the metal securely and tightly within said recess. This bending of the lugs or projections outwardly and backwardly causes a similar bending of the free edge portion of the metal, which is thus bent or stretched to a considerable extent, and which breaks or cracks in such bending as indicated at 11 in Fig. 2. The breaking of this sheet by the malleable lugs 8 causes shoulders to be made and stand up, against the edges of which lug 8 impinges and is thereby prevented from turning. This is an important feature, since as heretofore constructed, when a heavy wrench is applied to the coupling, the entire connection frequently turns in its seat in the radiator section. This turning is positively prevented in the present construction by the engagement of the lug 8 with the broken edges of the metal. The connection can be formed in this manner very quickly, and at a comparatively small expense, and form a secure and tight joint between the nipple or coupling and the radiator section, this joint being of a character which will not be affected or destroyed by heat.

It will be obvious that the form of the nipple or coupling and of its exterior recess may be varied to suit the rings 10 of different cross-sectional forms, and various other changes may be made without departing from the spirit and scope of my invention as defined in the claims.

What I claim is:—

1. In a radiator connection, the combination with a sheet metal radiator section having an opening therein, of a nipple or coupling inserted in said opening, said nipple or coupling having an exterior groove or recess, a ring seated in said groove or recess, the edge portion of the metal of the radiator section being bent partially around said ring, and the nipple or coupling having lugs or projections at its inner end bent outwardly and backwardly against the edge portion of the metal, thereby bending and cracking the same and securing the bent and cracked edge together with the ring within said groove or recess, and the lugs engaging the bent and cracked portion of the metal to hold the connection from turning; substantially as described.

2. In a radiator connection, the combination with a sheet metal radiator section, having an opening therein, of a nipple or coupling having a portion extending through said opening, and an exterior flange fitting against the outer side of the section around said opening, a ring seated around the inner end portion of the nipple or coupling, the metal of the section being bent underneath said flange and partially around said ring, and the inner end of the nipple or coupling having bent portions which engage and clamp the ring and metal, said engagement bending and splitting the edge portion of the metal, and the bent portion of the nipple or coupling having a locking engagement with the split edge portions of the metal; substantially as described.

3. In a radiator connection, a coupling member inserted in an opening in the radiator section and having spaced malleable lugs at its inner end which have a clamping engagement with the metal of the section surrounding said opening, said metal having projecting broken edges for locking engagement with the edges of the said lugs, together with a member seated around the coupling member and between which and the body portion of the member and also between which and the lugs the metal of the radiator section is clamped by the lugs, substantially as described.

In testimony whereof, I have hereunto set my hand.

HARRY W. ARMSTRONG.

Witnesses:
GEO. H. PARMELEE,
H. M. CORWIN.